US008105407B2

(12) United States Patent
Taniguchi

(10) Patent No.: US 8,105,407 B2
(45) Date of Patent: Jan. 31, 2012

(54) AIR CLEANER FOR INTERNAL COMBUSTION ENGINE

(75) Inventor: Toru Taniguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 12/455,188

(22) Filed: May 29, 2009

(65) Prior Publication Data

US 2009/0314249 A1 Dec. 24, 2009

(30) Foreign Application Priority Data

Jun. 24, 2008 (JP) ................................ 2008-164364

(51) Int. Cl.
*B01D 46/00* (2006.01)
*F02M 35/04* (2006.01)

(52) U.S. Cl. ............ 55/385.3; 55/498; 55/502; 55/510; 123/198 E

(58) Field of Classification Search ................ 55/385.1, 55/385.3, 317, 510; 180/68.3; 210/232, 210/438, 455, 497.01; 123/198 E
See application file for complete search history.

(56) References Cited

U.S. PATENT DOCUMENTS 3,737,002 A * 6/1973 Yotsumoto .................. 180/68.3
3,898,066 A * 8/1975 Miskiewicz .................. 55/317
4,198,217 A * 4/1980 Erdmannsdorfer .......... 55/385.5
4,871,381 A * 10/1989 Smith ......................... 55/385.3
4,917,202 A * 4/1990 Glover et al. ............... 180/68.3
5,053,129 A * 10/1991 Kitson ......................... 210/232
5,484,527 A * 1/1996 Janik et al. .................... 210/232
5,753,120 A * 5/1998 Clausen et al. ............... 210/438
6,955,697 B1 * 10/2005 Hsu et al. ...................... 55/385.1
7,217,361 B2 * 5/2007 Connor et al. ................ 210/232

FOREIGN PATENT DOCUMENTS

JP 57-140555 8/1982
JP H02-39286 B 9/1990
JP H05-33727 B 8/1993

* cited by examiner

*Primary Examiner* — Duane Smith
*Assistant Examiner* — Minh-Chau Pham
(74) *Attorney, Agent, or Firm* — Carrier Blackman & Associates, P.C.; Joseph P. Carrier; William D. Blackman

(57) ABSTRACT

Air filtered through a filter element in a case is supplied via an air outlet port to a carburetor. Bottom plate of the case includes a support frame section bulging inwardly of the case. The support frame section includes a peripheral wall surrounding the periphery of the outlet port, a plurality of posts extending upward from the peripheral wall, and a canopy portion of a plate shape provided on the upper ends of the posts. Interior of the case and the outlet port are in communication with each other via a space between the posts, and the canopy portion covers the whole opening area of the outlet port.

9 Claims, 6 Drawing Sheets

AIR CLEANER FOR INTERNAL COMBUSTION ENGINE

FIELD OF THE INVENTION

The present invention relates to an improvement in air cleaners for internal combustion engines.

BACKGROUND OF THE INVENTION

Internal combustion engines are used in a variety of environments. In the case of a working machine provided with an internal combustion engine, for example, the working machine may produce dust during working operation. Air cleaners for internal combustion engines (hereinafter referred to as internal combustion engine air cleaners) are required to be capable of constantly supplying sufficiently-filtered air to the internal combustion engine via a carburetor even though they are used in a variety of environments. Thus, improvement in internal combustion engine air cleaners has been under way in recent years, examples of which are disclosed in Japanese Utility Model Application Post-Exam Publication No. HEI-05-33727 (hereinafter referred to as "Patent Literature 1") and Japanese Patent Application Post-Exam Publication No. HEI-02-39286 (hereinafter referred to as "Patent Literature 2").

In the internal combustion engine air cleaner disclosed in Patent Literature 1, an air outlet port is formed in a bottom plate of a case accommodating therein an annular filter element, and air filtered through the filter element is supplied to the carburetor via the air outlet port. The air outlet port is surrounded by the filter element and also covered with a cylindrical filter provided in an inner space defined by the annular filter element.

In the internal combustion engine air cleaner disclosed in Patent Literature 2, an air outlet port is formed in a bottom plate of a case accommodating therein a generally cylindrical filter element, and air filtered through the filter element is supplied to the internal combustion engine via the air outlet port. The air outlet port is surrounded by the filter element, and a support frame section extends upward from an upper surface portion of the bottom plate around the air outlet port. The filter element is placed on the support frame section, then a cover is placed on the bottom plate, and then the filter element and cover are bolted together to the upper surface of the support frame section. In this manner, the filter element and cover are fixedly mounted on the bottom plate of the case via the support frame section.

Generally, if used for a long time, the air cleaner filter element would be clogged with various dust, such as dust in the air. Thus, there arises a need to inspect and clean or replace the filter element at suitable time intervals. As the filter element is detached from the case, dust adhering to the filter element can fall onto the bottom plate of case. In cleaning the dust accumulated on the bottom plate, a human operator has to pay close attention to avoid the dust entering the air outlet port. Thus, the cleaning of the air cleaner tends to be cumbersome and troublesome operation.

SUMMARY OF THE INVENTION

In view of the foregoing prior art problems, it is an object of the present invention to provide a technique which can clean, with an enhanced ease and efficiency, an internal combustion engine air cleaner that has an air outlet port formed in a bottom plate of a case accommodating therein a filter element.

In order to accomplish the above-mentioned object, the present invention provides an improved internal combustion engine air cleaner, which comprises a filter element, and a case accommodating therein the filter element and including a bottom plate having an air outlet port formed therein, air filtered through the filter element being supplied via the air outlet port to a carburetor. The bottom plate includes a support frame section bulging from the inner surface thereof inwardly of the case. The support frame section includes: a side peripheral wall extending upward from the inner surface of the bottom plate in such a manner as to surround the periphery of the air outlet port; a plurality of vertical posts spaced apart from each other along, and extending upward from, the upper end of the side peripheral wall; and a canopy portion of a generally flat plate shape provided on the respective upper ends of the plurality of vertical posts to extend over the air outlet port. The interior of the case and the air outlet port are in communication with each other via a space between the plurality of vertical posts, and the canopy portion covers the whole opening area of the air outlet port when the case is viewed from above.

According to the present invention, not only the periphery of the air outlet port is surrounded by the side peripheral wall extending upward from the inner surface of the bottom plate, but also the whole opening area of the air outlet port is covered with the canopy portion. Air filtered through the filter element flows from the interior of the case into the air outlet port via the space between the vertical posts, and then is supplied from the air outlet port to the carburetor.

When the filter element is inspected and cleaned or replaced, dust adhering to the filter element can fall onto the bottom plate. During cleaning of the dust accumulated on the bottom plate, the side peripheral wall and canopy portion can reliably prevent the dust from entering the air outlet port. Thus, a human operator does not have to pay excessive attention so as to avoid unwanted entry of the dust into the air outlet port. As a consequence, the dust cleaning operation can be performed with ease and within a short time.

Preferably, the filter element comprises an element body having an annular shape as viewed in plan and placed on the inner surface of the bottom plate, and an upper holder holding the element body and closing an upper end of the element body, and at least a portion of the inner surface, including the air outlet port, of the bottom plate and the support frame section are surrounded by the element body. Further, at least the portion of the inner surface, surrounded by the element body, of the bottom plate is formed as a flat surface, and the upper surface of the canopy portion is formed as a flat surface. Because at least a portion of the inner surface, surrounded by the element body, of the bottom plate and the upper surface of the canopy portion are formed flat, there is no concavity and convexity on these surfaces, and thus, the human operator can perform the cleaning operation with an utmost ease.

Preferably, when the case is viewed from above, the outline of the support frame section generally conforms to the outline of the inner peripheral surface of the element body. Thus, there can be provided a generally uniform and sufficient gap between the inner peripheral surface of the element body and the support frame section. Thus, the present invention can reduce the loss of pressure with which the air, having passed through the element body, flows to the air outlet port via the space between the vertical posts, to thereby prevent an adverse influence on the flow of the air to be absorbed by a negative pressure of the internal combustion engine.

Preferably, the support frame section has a meshed filter provided in the space between the plurality of vertical posts. Thus, during the cleaning of the dust accumulated on the bottom plate and canopy portion, the present invention can prevent the dust from entering the air outlet port with an even further increased reliability.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

A preferred embodiment of an internal combustion engine air cleaner of the present invention will hereinafter be described as applied to a walk-behind lawn mowing machine. In the following description, the terms "front", "rear", "left" and "right", "upward" and "downward" are used to refer to directions as viewed from a human operator operating the walk-behind lawn mowing machine.

Figure 1:
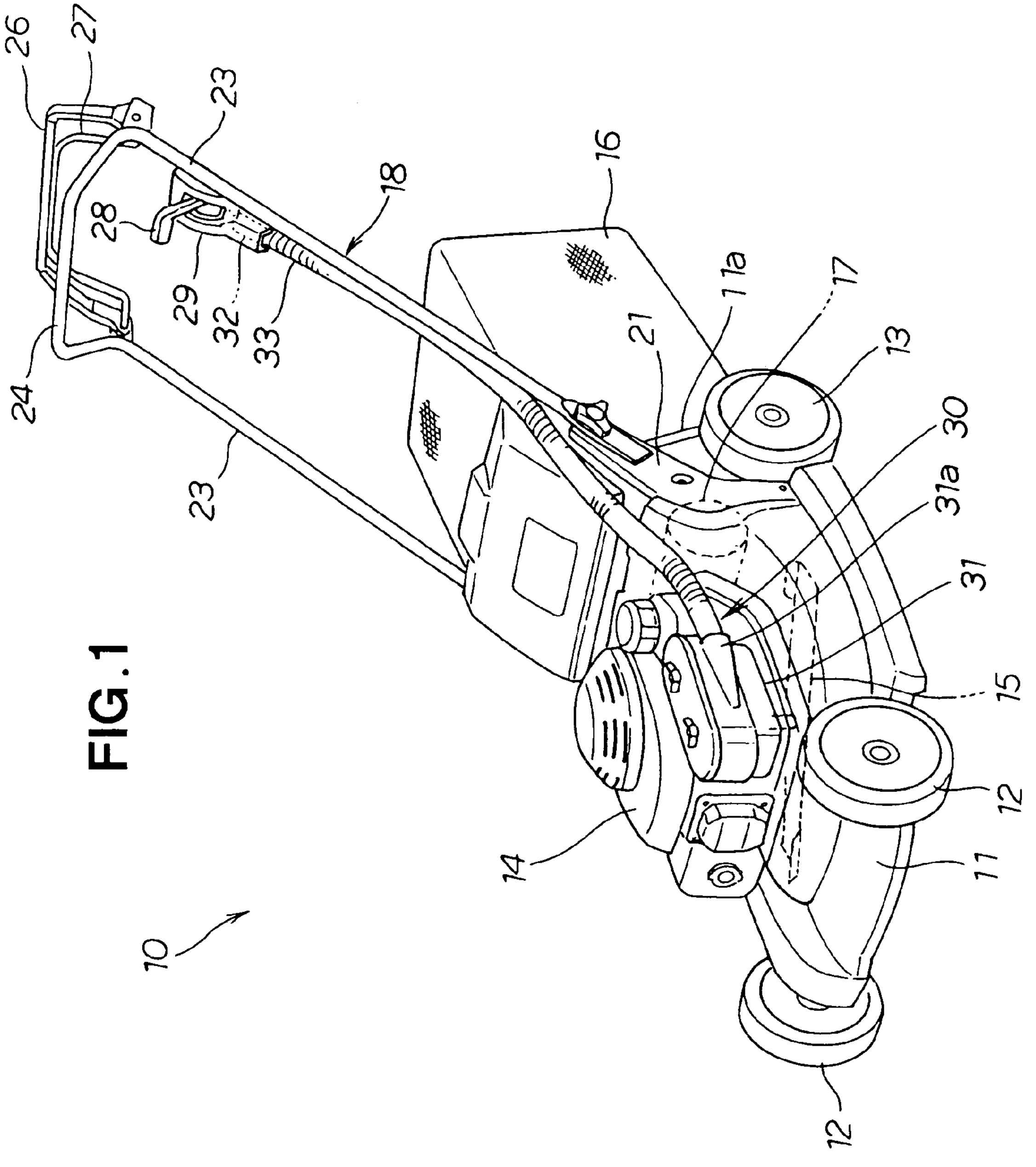
FIG. 1 is a perspective view of a walk-behind lawn mowing machine equipped with an internal combustion engine air cleaner according to an embodiment of the present invention.

Reference is now made to FIG. 1 showing in perspective the walk-behind lawn mowing machine 10 equipped with an embodiment of the internal combustion engine air cleaner of the present invention. The walk-behind lawn mowing machine 10 includes: a downwardly-opening cutter deck 11; left and right front wheels 12 and left and right rear wheels 13 mounted on front and rear portions of the cutter deck 11; a cutter blade 15 provided inside the cutter deck 11; a cut-lawn storing container 16 provided in a cut-lawn discharge port ha formed in a rear portion of the cutter deck 11; a transmission (speed changer) 17 mounted on a rear underside portion of the cutter deck 11; and an operating handle 18 mounted on a rear upper portion of the cutter deck 11.

Engine 14 is a drive source for not only driving the cutter blade 15 via a not-shown working clutch but also driving the rear wheels 13 via the transmission 17. The transmission 17 can change the rotating speed of the rear wheels 13 in a continuous manner from a zero speed to a high speed region. The transmission 17 has a so-called clutch function of connecting and disconnecting the output power of the engine 14 to and from the rear wheels 13; namely, the transmission 17 stops the rotation of the rear wheels 13 by disconnecting the output power from the engine 14 and rotates the rear wheels 13 by connecting the output power from the engine 14. The cut-lawn storing container 16 is a bag for storing turf grass cut by the cutter blade 15 (hereinafter referred to as "cut lawn").

The operating handle 18 is mounted to a handle support section 21 provided on a rear upper portion of the cutter deck 11. The operating handle 18, which is an operating member having a substantially inverted-U shape as viewed in front elevation, includes left and right handle bars 23 extending rearward and upward (i.e., toward the human operator) from the cutter deck 11 via the handle support section 21, and a horizontal grip section 24 inter-connecting respective upper end portions of the left and right handle bars 23.

The left and right handle bars 23 has a working clutch lever 26 and a running clutch lever 27 provided on respective upper end portions of the left and right handle bars 23, and these levers 26 are 27 are pivotable in a front-rear direction. The working clutch lever 26 is an operating member operable by the human operator to turn on/off the working clutch (not shown), and the running clutch lever 27 is an operating member operable by the human operator to turn on/off the transmission 17 equipped with the clutch function.

The operating handle 18 has an operating lever 28 provided on the left handle bar 23, and the operating lever 28 is an operating member operable by the human operator to manually adjust the transmission 17. The operating lever 28 has a base section whose outer peripheral portion is covered with a lever cover 29 from above.

The walk-behind lawn mowing machine 10 further includes an air intake device 30 of the engine 14, and this air intake device 30 includes the internal combustion engine air cleaner 31, an air introducing section 32 and an air introducing pipe or duct 33. The air cleaner 31 is provided on the left side of the engine 14 and connected to an air intake port of the engine 14 via a later-described carburetor 35. The air introducing section 32 is located remotely from the air cleaner 31, i.e. in the lever cover 29 provided on the operating handle 18. The air introducing duct 33 functions to convey external air, introduced via the air introducing section 32, to an air inlet port 31*a* of the air cleaner 31.

The air intake device 30 employs a so-called "snorkel-type air cleaner structure" where the air introducing section 32 for introducing external air into the air cleaner 31 is provided at a relatively large distance from the ground surface, i.e. on the operating handle 18 and the air introducing duct 33 conveys the air from the air introducing section 32 to the air cleaner 31 via the air introducing duct 33. As the engine 14 is activated, external air is taken in via the air introducing section 32 and conveyed, via the air introducing duct 33, into the air cleaner 31 through the air inlet port 31*a*.

Figure 2:
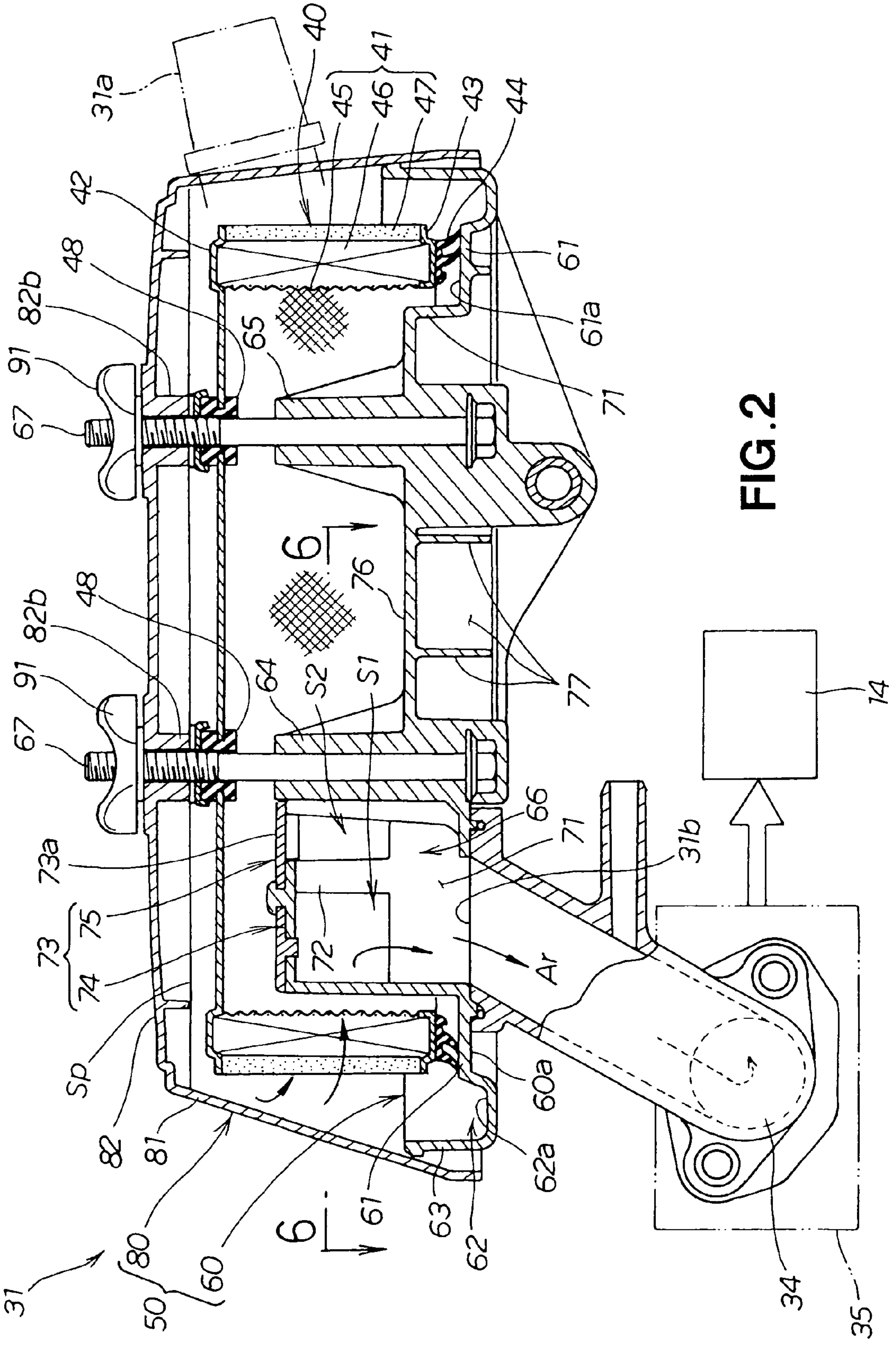
FIG. 2 is a side view of the internal combustion engine air cleaner shown in FIG. 1.
Figure 3:
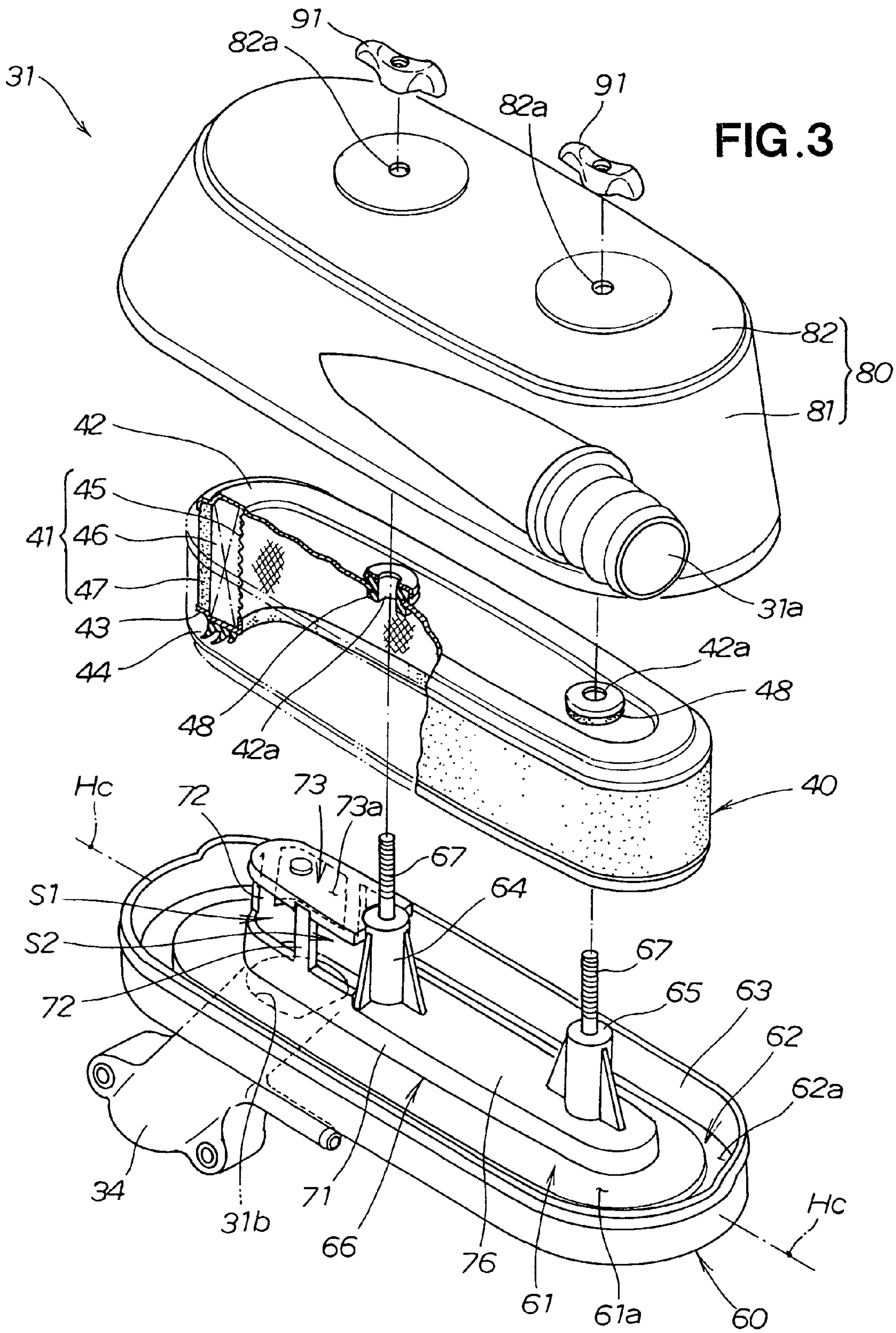
FIG. 3 is an exploded view of the air cleaner shown in FIG. 2.
Figure 4:
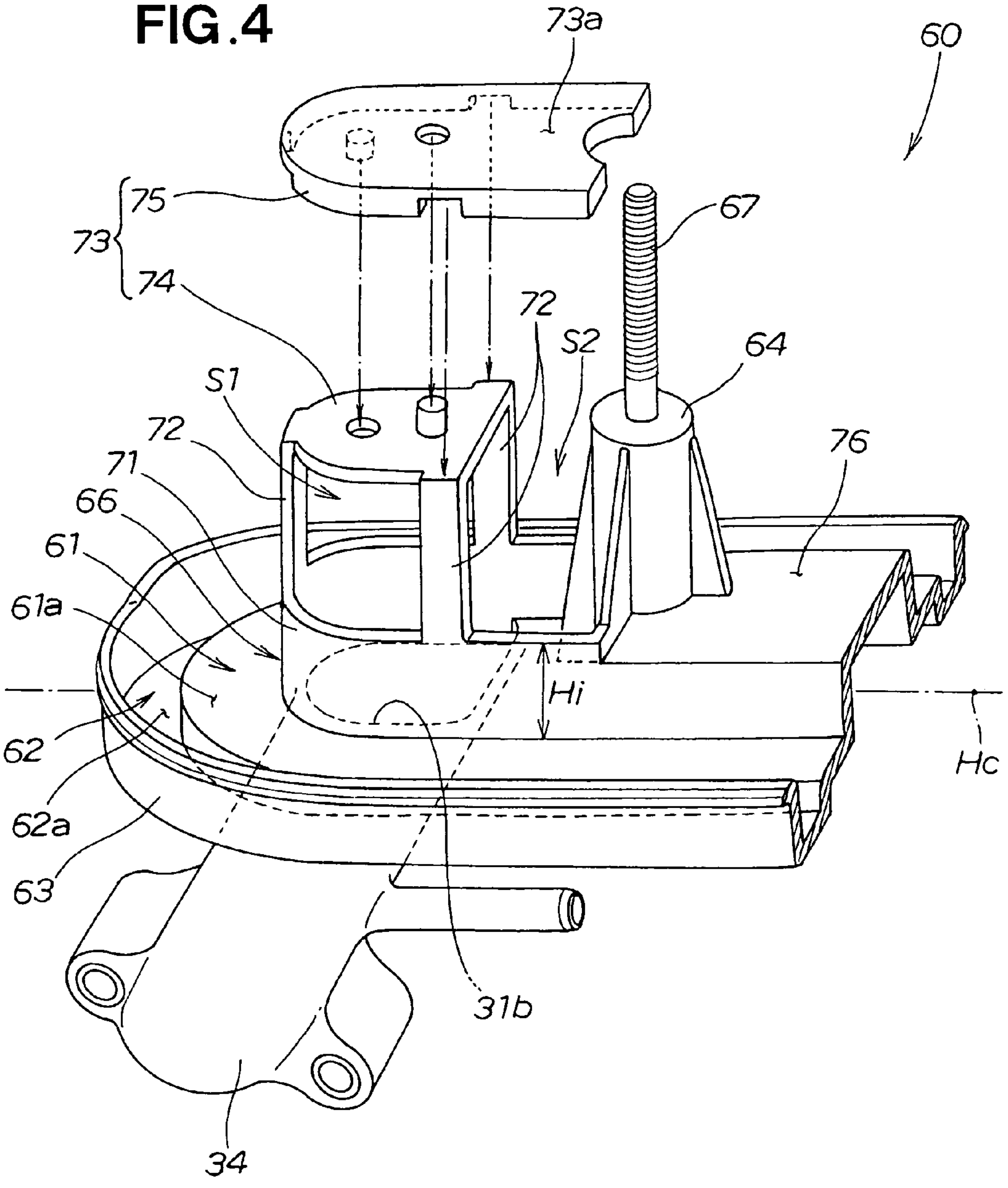
FIG. 4 is an exploded view of a support frame section and other components disposed around the support frame section shown in FIG. 3.
Figure 5:
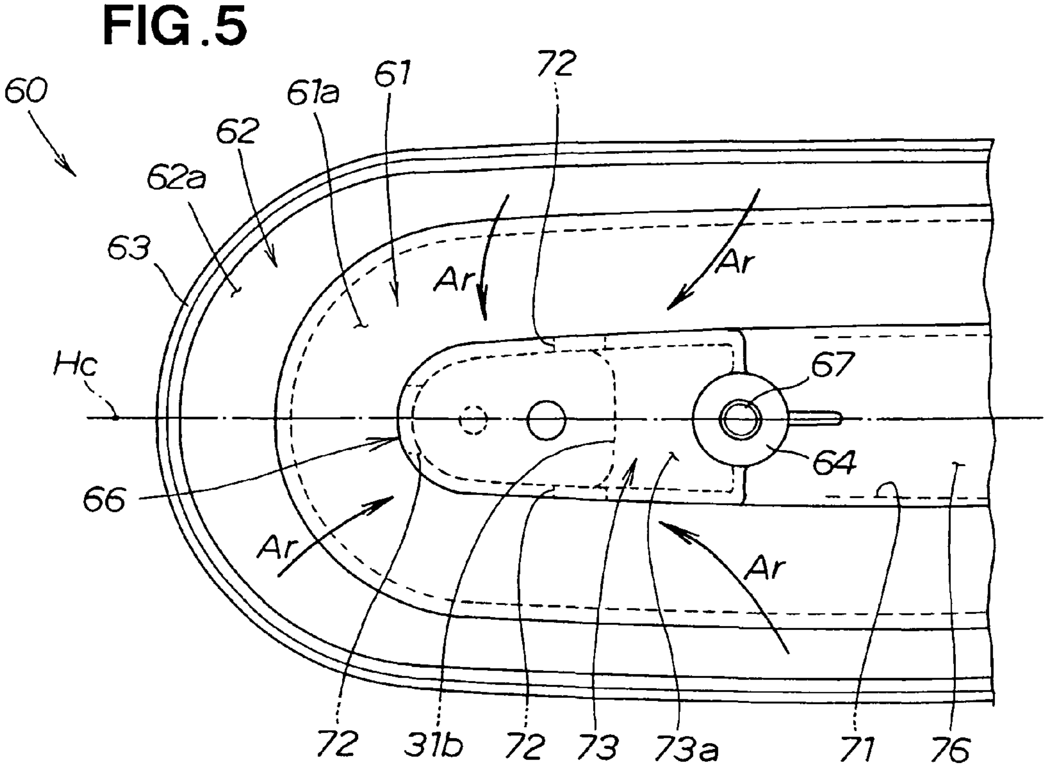
FIG. 5 is a plan view of the support frame section and other components disposed around the support frame section shown FIG. 2.

Next, a detailed description will be given about the air cleaner 31. FIG. 2 is a side view of the air cleaner 31 shown in FIG. 1, and FIG. 3 is an exploded view of the air cleaner 31 shown in FIG. 2. Further, FIG. 4 is an exploded view of a support frame section and other components disposed around the support frame section shown in FIG. 3, FIG. 5 is a plan view of the support frame section and other components disposed around the support frame section shown FIG. 2, and FIG. 6 is a sectional view taken along the 6-6 line of FIG. 2.

As shown in FIGS. 2 and 3, the internal combustion engine air cleaner 31 filters air, introduced via the air inlet port 31*a*, by means of a filter element 40, supplies the thus-filtered air from an air outlet port 31*b* to the carburetor 35 via a supply duct 34, and further supplies the air from the carburetor 35 to the engine (internal combustion engine) 14.

The air cleaner 31 has a substantially oval overall shape as viewed in plan, which is generally symmetrical about its longitudinal centerline HC (see FIG. 3). The air cleaner 31 includes the filter element 40 and a case 50 accommodating therein the filter element 40.

Figure 6:
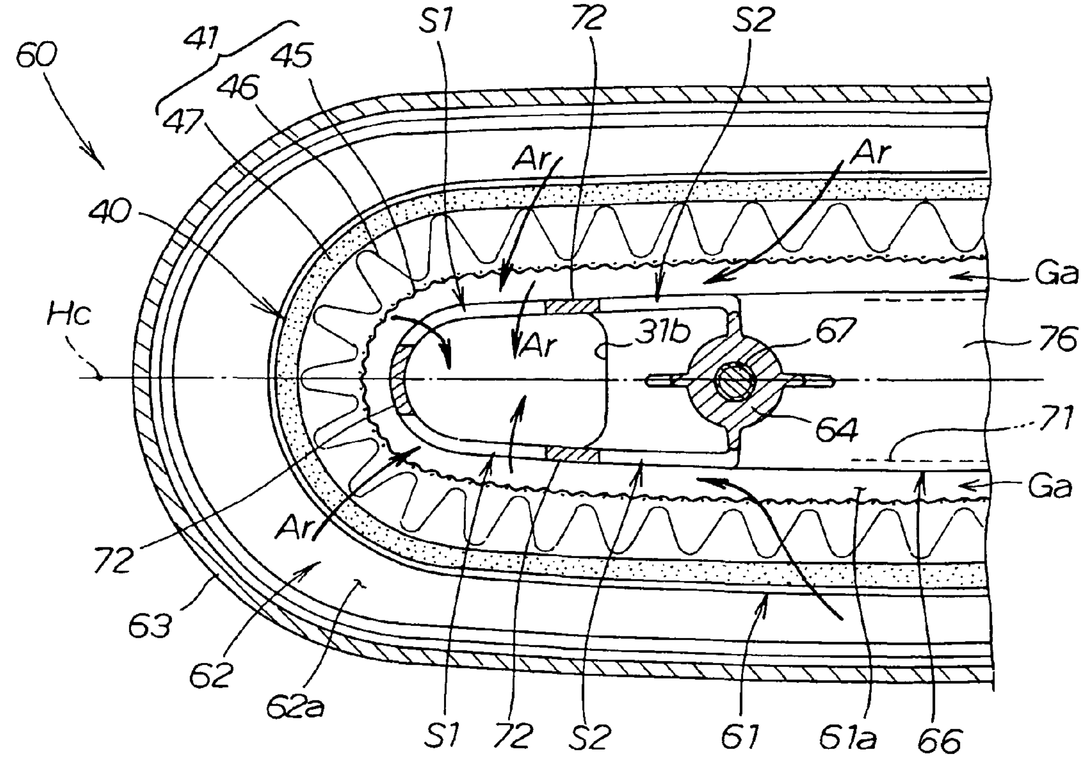
FIG. 6 is a sectional view taken along line 6-6 of FIG. 2.

As shown in FIGS. 2, 3 and 6, the filter element 40 has a substantially oval overall shape as viewed in plan. The filter element 40 includes: an element body 41 having an annular shape as viewed in plan; an upper holder 42 not only closing the upper end of the element body 41 but also holding the element body 41; a lower holder 43 provided on the lower end edge of the element body 41; and a seal member 44 provided on the lower end surface of the lower holder 43.

The element body 41 is an annular member of a predetermined height and has a substantially oval overall shape as viewed in plan. More specifically, longitudinally opposite end portions of the element body 40 each have a generally semicircular shape as viewed in plan. The element body 40 includes a core member 45 having an annular shape as viewed in plan, a filter section 46 having an annular shape as viewed in plan and surrounding and attached to the outer peripheral surface of the core member 45, and a covering section 47 having an annular shape as viewed in plan and surrounding and attached to the outer peripheral surface of the filter section 46. The core member 45 is in the form of a metal mesh, the filter section 46 is in the form of a corrugated filter paper, and the covering section 47 is formed of a breathable foam material, such as rubber or resin foam.

The upper holder 42 is a member of a generally flat plate shape, which has two bolt holes 42*a* (FIG. 3) each having an air seal member 48 of a grommet shape fitted therein. The lower holder 43 is a member of a generally flat plate shape generally conforming to the annular shape of the element body 41. The seal member 44 secures airtightness between the inner surface of the case 50 and the filter element 40.

As shown in FIGS. 2 and 3, the case 50 (see FIG. 2) has a substantially oval overall shape as viewed in plan so as to accommodate therein the elongated filter element 40. The case 50 includes a bottom plate 60, and a case body 80 placed on the bottom plate 60 to define an interior accommodating space Sp (see FIG. 2).

As shown in FIGS. 2-6, the bottom plate 60 is generally in the form of a flat plate having a substantially oval overall shape as viewed in plan. More specifically, the bottom plate 60 is an integral, one-piece molded member, which has a flat plate section 61 located centrally on the plate 60 as viewed in plan, a collecting groove 62 surrounding the entire outer periphery of the flat plate section 61, a side peripheral wall 63 surrounding the entire outer periphery of the collecting groove 62, two protrusions 64 and 65 protruding upwardly or inwardly of the case 50 from the upper surface 61*a* of the flat plate section 61, and the support frame section 66 bulging inwardly of the case 50 from the upper surface 61*a* of the flat plate section 61.

The upper surface 61*a* of the flat plate section 61 is a horizontal flat surface. When the case 50 is viewed from above, the flat plate section 61 has an outline (i.e., shape and size) generally conforming to the outlines of the outer peripheries of the element body 41 and seal member 44. The flat plate section 61 has a substantially oval overall shape as viewed in plan and has the air outlet port 31*b* formed in a region thereof adjacent to one of the longitudinally opposite ends (front end in the illustrated example), and the air outlet port 31*b* extends vertically through the thickness of the flat plate section 61. The air outlet port 31*b* is connected to the supply duct 34 on the lower end surface 60*a* of the bottom plate 60; the supply duct 34 is fixedly mounted to the lower end surface 60*a* of the bottom plate 60.

The collecting groove 62, which is provided for gathering dust accumulated on the bottom plate 60, is a groove having a generally rectangular shape opening upwardly as viewed in side elevation. The bottom surface 62*a* of the collecting groove 62 is a horizontal flat surface, and the side peripheral wall 63 projects upwardly from the bottom of the collecting groove 62 to surround the entire outer periphery of the collecting groove 62.

The two protrusions 64 and 65 are located in a row in the longitudinal direction of the flat plate section 61, i.e. on the longitudinal centerline HC. The protrusions 64 and 65 each have a mounting bolt 67 projecting upward beyond the upper end surface thereof and is insert-molded to the protrusion 64 or 65. The protrusion 64 located adjacent to the air outlet port 31*b* will hereinafter be referred to as "first protrusion 64", while the protrusion 65 located remote from the air outlet port 31*b* will hereinafter be referred to as "second protrusion 65". The first protrusion 64 is located between the air outlet port 31*b* and the second protrusion 65 and proximate to the edge of the air outlet port 31*b*.

As noted above, the bottom plate 60 has the support frame section 66 bulging inwardly of the case 50 in such a manner as to surround the air outlet port 31*b*. The support frame section 66 functions to not only prevent dust present on the bottom plate 60 from entering the air outlet port 31*b* but also direct air Ar, having been filtered through the filter element 40, to the air outlet port 31*b*.

Dust may be prevented from entering the air outlet port 31*b* to some extent if only the periphery of the air outlet port 31*b* is surrounded and covered with the support frame section 66. In this case, however, there would occur a great loss of pressure with which the air Ar, having been filtered through the filter element 40, flows to the air outlet port 31*b*, which could greatly adversely influence the flow of the air Ar to be absorbed by a negative pressure of the engine 14.

Therefore, in the instant embodiment, the support frame section 66 is constructed to have an outline generally conforming to the outline of the inner peripheral surface of the element body 41 (i.e., conforming to the outline of the inner peripheral surface of the core member 45), so that there is provided a generally uniform gap Ga between the inner peripheral surface of the element body 41 and the support frame section 66. Thus, it is possible to effectively reduce the loss of pressure with which the air Ar flows to the air outlet port 31*b*.

The support frame section 66 has a side peripheral wall 71 projecting upward from the upper surface 61*a* of the flat plate section 61 in such a manner as to surround at least the periphery of the air outlet port 31*b*, a plurality of vertical posts 72 extending upward from the upper end of the side peripheral wall 71, and a canopy portion 73 provided on the respective upper ends of the plurality of vertical posts 72 to extend over and cover the air outlet port 31*b*.

More specifically, when the case 50 is viewed from above, the side peripheral wall 71 has a substantially oval shape generally conforming to the outline of the flat plate section 61. In FIG. 4, reference character Hi represents a height from the upper surface 61*a* of the flat plate section 61 to the upper end of the peripheral wall 71. The periphery of the air outlet port 31*b* is surrounded by the peripheral wall 71 and first protrusion 64. In other words, the first protrusion 64 functions also as part of the peripheral wall surrounding the periphery of the air outlet port 31*b*.

The plurality of vertical posts 72 are bars projecting straight upward integrally from the upper end of the peripheral wall 71, which are spaced apart from one another and arranged around the air outlet port 31*b* when the case 50 is viewed from above. The interior of the case 50 and the air outlet port 31*b* are in fluid communication with each other via spaces S1 between the plurality of vertical posts 72 and space S2 between the vertical posts 72 and the first protrusion 64. The spaces S1 and S2 will hereinafter be referred to as "air passages S1 and S2". The spaces S1 and S2 are located higher than the upper surface 61*a* of the flat plate section 61 by the height Hi (FIG. 4).

The canopy portion 73 is a flat plate that covers at least the whole opening area of the air outlet port 31*b* when the case 50 is viewed from above, and that is located parallel to the flat plate section 61. The upper surface 73*a* of the canopy portion 73 is located at substantially the same height as the upper end surface of the first protrusion 64. Thus, to facilitate molding of the canopy portion 73, the canopy portion 73 comprises upper and lower plates 75 and 74 each having a flat plate shape. More specifically, the canopy portion 73 comprises the lower plate 74 provided integrally on the respective upper ends of the vertical posts 72, and the upper plate 75 fixedly placed on the lower plate 74. The upper plate 75 has a greater length than the lower plate 74. For example, the upper plate 75 is first positioned relative to the lower plate 74 and upper ends of the vertical posts 72 and then fixed to the lower plate 74 by thermal caulking, by means of screws or rivets, or otherwise. The upper plate 75 may be provided integrally on the upper ends of the vertical posts 72.

As noted above, the periphery of the air outlet port 31*b* is surrounded by the peripheral wall 71 and first protrusion 64. Except in the region where the air outlet port 31*b* is surrounded by the peripheral wall 71 and first protrusion 64, the upper end of the peripheral wall 71 is closed with a horizontal flat closing plate 76. The upper surface of the closing plate 76 lies parallel to the upper surface 61*a* of the flat plate section 61.

Under the flat closing plate 76, the peripheral wall 71 is reinforced with a plurality of ribs 77 (FIG. 2) that are located in a space surrounded by the peripheral wall 71 and- flat closing plate 76 and integrally formed with the peripheral wall 71 and closing plate 76. Because the plurality of ribs 77 are provided using the space defined under the closing plate 76, there is no need to provide reinforcing ribs projecting upward from the upper surface of the closing plate 76; and thus, cleaning regions at and over the upper surface of the closing plate 76 can be facilitated.

As shown in FIGS. 2 and 3, the case body 80 is an integral, one-piece molded member of resin having an elongated box shape and opening downwardly, which has a side peripheral wall 81 of a substantially upwardly-tapering (or downwardly-flaring) shape and a ceiling wall 82 closing the upper end of the side peripheral wall 81. The case body 80 has the air inlet port 31*a* formed therein. The ceiling wall 82 has two bolt holes 82*a*.

Next, a description will be given about how the air cleaner 31 of the invention is assembled. First, as shown in FIGS. 2 and 3, the filter element 40, orientated in such a way that the seal member 44 is located at the bottom of the element 40, is placed on the flat plate section 61, so that the mounting bolts 67 extend through the corresponding bolt holes 42*a* as seen in FIG. 3. Thus, at least a portion of the inner surface, including the air outlet port 31*b*, of the bottom plate 60 and the support frame section 66 are surrounded by the element body 41. The term "inner surface" (also referred to as "bottom surface") of the bottom plate 60 is used to generically refer to the upper surface 61*a* of the flat plate section 61 and the bottom surface 62*a* of the collecting groove 62. At least the portions of the inner surfaces 61*a* and 62*a* which are surrounded by the element body 41 are formed flat (i.e., as flat surfaces).

After that, the case body 80 is placed on the bottom plate 60, so that respective boss portions 82*b* (FIG. 3) of the bolt holes 82*a* formed in the ceiling wall 82 abut against the upper ends of the seal members 48 and the mounting bolts 67 pass through the corresponding bolt holes 82*a*. Then, nuts 91 are screwed onto the mounting bolts 67 to fixedly mount the filter element 40 and case body 80 to the bottom plate 60. Namely, the filter element 40 and case body 80 are together fixed to the bottom plate 60 by means of the mounting bolts 67 and nuts 91. Airtightness between the bottom plate 60 and the filter element 40 is secured by the seal members 44. In this manner, the operation for assembling the air cleaner 31 is completed.

Next, a description will be given about how to inspect and clean or replace the filter element 40. First, as shown in FIGS. 2 and 3, the nuts 91 are removed to detach the case body 80 from the bottom plate 60, so that the filter element 40 is exposed. Then, the filter element 40 is lifted and detached from the bottom plate 60 set in a horizontal posture. After that, the filter element 40 is inspected and cleaned or replaced.

When the filter element 40 is inspected and cleaned or replaced, dust adhering to the filter element 40 can fall onto the bottom plate 60. In cleaning the dust accumulated on the bottom plate 60, the human operators of the prior art air cleaners would have to pay close attention to avoid the dust entering the air outlet port, and thus, the cleaning of the air cleaners tends to be cumbersome and troublesome operation, as set forth earlier.

To avoid such a prior art problem, the periphery of the air outlet port 31*b* is surrounded by the inner surface of the bottom plate 60, more specifically by the side peripheral wall 71 projecting upward from the upper surface 61*a* of the flat plate section 61. Besides, the region immediately over the air outlet port 31*b* is covered with the canopy portion 73, namely, the whole opening area of the air outlet port 31*b* is covered with the canopy portion 73 as viewed in plan. Air having been filtered through the filter element 40 flows from the interior of the case 50 into the air outlet port 31*b* via the spaces S1 between the plurality of vertical posts 72, and then is supplied from the air outlet port 31*b* to the carburetor 35.

During the cleaning of the dust accumulated on the bottom plate 60, the side peripheral wall 71 and canopy portion 73 can reliably prevent the dust from entering the air outlet port 31*b*, and thus, the human operator does not have to pay excessive attention so as to avoid unwanted entry of the dust into the air outlet port 31*b*. As a consequence, the dust cleaning operation can be performed with ease and within a short time.

Further, at least portions of the inner surfaces 61*a* and 62*a*, surrounded by the element body 41, of the bottom plate 60 are formed flat, and the upper surface 73*a* of the canopy portion 73 is also formed flat. With no concavity and convexity on these surfaces, the human operator can perform the cleaning operation with an utmost ease.

Furthermore, because the outline of the support frame section 66 generally conforms to the outline of the inner peripheral surface of the element body 41, there can be provided a generally uniform and sufficient gap Ga between the inner peripheral surface of the element body 41 and the support frame section 66. Thus, the instant embodiment allows the air Ar, having passed through the element body 41, to smoothly pass the gap Ga to flow to the air outlet port 31*b* via the spaces S1 between the vertical posts 72. In this way, the instant embodiment can effectively reduce the loss of pressure with which the air Ar, having passed through the element body 41, flows to the air outlet port 31*b* via the spaces S1, to thereby prevent an adverse influence on the flow of the air to be absorbed by a negative pressure of the engine 14.

Figure 7:
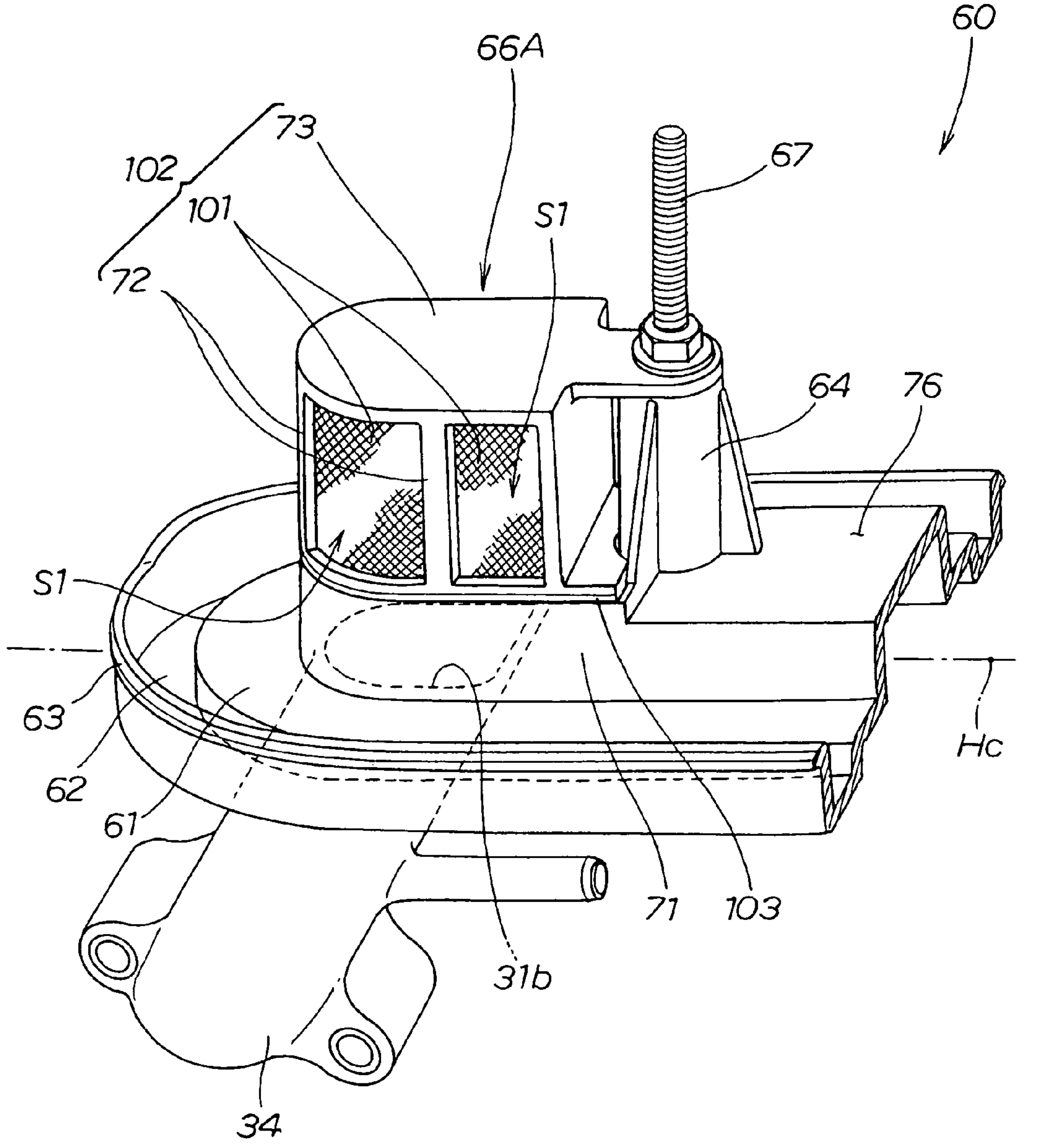
FIG. 7 is a perspective view showing a modification of the support frame section.

The following describe a modification of the support frame section 66, with reference to FIG. 7. The modified support frame section 66A is generally similar to the support frame section 66 but different from the support frame section 66 in that meshed filters 101 are provided in the spaces (i.e., air passages) S1 between the vertical posts 72. Similar elements to those shown in FIGS. 1-6 are indicated by the same reference numerals and characters as used for the support frame section 66 and will not be described here to avoid unnecessary duplication.

More specifically, in the modified support frame section 66A, the vertical posts 72 and canopy portion 73 are formed separately from (i.e., not integrally with) the side peripheral wall 71, so as to provide a detachable auxiliary filter 102 that integrally includes the vertical posts 72, canopy portion 73 and filter 101.

The modified support frame section 66A is assembled by superposing the auxiliary filter 102 on the upper end surface of the side peripheral wall 71 and fastening the auxiliary filter 102 by means of the mounting bolt 67. Consequently, the whole opening area of the air outlet port 31*b* can be covered with the modified support frame section 66A.

Preferably, a seal member 103 seals between the upper end surface of the side peripheral wall 71 and the auxiliary filter 102. With the meshed filters 101 provided in the spaces (i.e., air passages) S1 between the vertical posts 72, it is possible to prevent dust, accumulated on the bottom plate 60 and canopy portion 73, from entering the air outlet port 31*b* with an even further increased reliability.

It is important to note that the present invention is applicable to other working machines and industrial machines than walk-behind law mowing machines, such as agricultural working machines, civil engineering working machines and delivery vehicles. Further, the air intake device 30 is not limited to the snorkel-type air cleaner structure and may be constructed in such a manner that external air is introduced into the air cleaner 31 disposed near the internal combustion engine 14.

Obviously, various minor changes and modifications of the present invention are possible in light of the above teaching. It is therefore to be understood that within the scope of the appended claims the invention may be practiced otherwise than as specifically described.

What is claimed is:

1. An internal combustion engine air cleaner comprising:

a filter element having an upper holder, a lower holder, and an element body arranged between the upper holder and the lower holder; and a case accommodating therein the filter element and including a bottom plate having an air outlet port formed therein, air filtered through the filter element being supplied via the air outlet port to a carburetor, the bottom plate including a support frame section bulging from an inner surface thereof inwardly of the case, the support frame section including:

a side peripheral wall extending upward from the inner surface of the bottom plate in such a manner as to surround a periphery of the air outlet port;

a plurality of vertical posts spaced apart from each other along and extending upward from an upper end of the side peripheral wall; and a canopy portion of a generally flat plate shape provided on respective upper ends of the plurality of vertical posts to extend over the air outlet port, said canopy portion being formed separately from the upper holder and the lower holder of the filter element, and being located at a position separate from the upper holder and the lower holder, an interior of the case and the air outlet port being in communication with each other via a space between the vertical posts, the canopy portion covering a whole opening area of the air outlet port when the case is viewed from above.

2. The internal combustion engine air cleaner of claim 1, wherein the filter element comprises the element body having an annular shape as viewed in a plan view and placed on the inner surface of the bottom plate, and the upper holder holding the element body and closing an upper end of the element body, at least a portion of the inner surface, including the air outlet port, of the bottom plate and the support frame section are surrounded by the element body, at least the portion of the inner surface, surrounded by the element body, of the bottom plate is formed as a flat surface, and an upper surface of the canopy portion is formed as a flat surface.

3. The internal combustion engine air cleaner of claim 1, wherein, when the case is viewed from above, an outline of the support frame section generally conforms to an outline of an inner peripheral surface of the element body.

4. The internal combustion engine air cleaner of claim 1, wherein the support frame section has a meshed filter provided in the space between the plurality of vertical posts.

5. The internal combustion engine air cleaner of claim 1, wherein said canopy portion is arranged such that said canopy portion prevents dust from entering the air outlet port during cleaning/replacement operation of the filter element.

6. The internal combustion engine air cleaner of claim 1, wherein the canopy portion comprises a lower plate integrally arranged on upper ends of the vertical posts, and an upper plate placed on the lower plate; and wherein said upper plate is longer than the lower plate.

7. The internal combustion engine air cleaner of claim 1, wherein the vertical posts and the canopy portion are formed separately from the side peripheral wall of the support frame section.

8. An air cleaner for internal combustion engine, said air cleaner comprising:

a filter element having an annular shaped element body, an upper holder for holding the element body, and lower holder arranged at lower end of the element body; and a case accommodating the filter element therein, said case comprising a bottom plate having an air outlet port formed therein, wherein air filtered through the filter element is supplied via the air outlet port to an inlet of the engine, the bottom plate comprising a support frame section, the support frame section comprising:

a side peripheral wall extending upward from the inner surface of the bottom plate in such a manner as to surround a periphery of the air outlet port;

a plurality of vertical posts spaced apart from each other along and extending upward from an upper end of the side peripheral wall; and a flat-plate shaped canopy portion provided on upper ends of the plurality of vertical posts to extend over the air outlet port, said canopy portion being separate from the upper holder of the filter element, and being located at a position separate from the upper holder, an interior of the case and the air outlet port being in communication with each other via a space between the vertical posts, the canopy portion covering at least an entire opening area of the air outlet port when the case is viewed from above; and a meshed filter provided in the space between the plurality of vertical posts.

9. An air cleaner according to claim 8, wherein said vertical posts and said canopy portion of the support frame section are formed separately from the side peripheral wall of the support frame section.

* * * * *